(12) United States Patent  
Upton

(10) Patent No.: US 6,515,490 B1  
(45) Date of Patent: Feb. 4, 2003

(54) CONDUCTIVE FLUID-BASED POSITION SENSOR AND METHOD

(75) Inventor: Eric Lawrence Upton, Bellevue, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 10/143,166

(22) Filed: May 10, 2002

Related U.S. Application Data

(62) Division of application No. 09/805,655, filed on Mar. 13, 2001.

(51) Int. Cl.$^7$ .............................................. G01R 27/26
(52) U.S. Cl. ....................................... 324/662; 324/671
(58) Field of Search ................................ 324/662, 671; 340/686.6

(56) References Cited

U.S. PATENT DOCUMENTS 5,760,590 A * 6/1998 Striffler ....................... 324/514

* cited by examiner

Primary Examiner—Christine K. Oda  
(74) Attorney, Agent, or Firm—Blakely, Sokoloff, Taylor & Zafman LLP

(57) ABSTRACT

An apparatus and method for determining a position and/or orientation of a conductor disposed in a conductive fluid. A plurality of electrodes disposed about the conductor and preferably being in contact with the conductive fluid are used to provide an electrical path between each electrode and the conductor. In one embodiment, resistances between each electrode and conductor are determined through use of a signal processing circuit. In another embodiment, capacitances between each electrode and the conductor are determined using a similar signal processing circuit. Once the resistances or capacitances are determined, the position of the conductor can be determined based on these values in combination with parameters relating to the configuration of the electrodes and conductor, as well as characteristics of the conductive fluid. In one implementation, the invention may be used in free space optical communication systems, whereby the position of the end portion of the fiber optic cable can be determined.

17 Claims, 10 Drawing Sheets

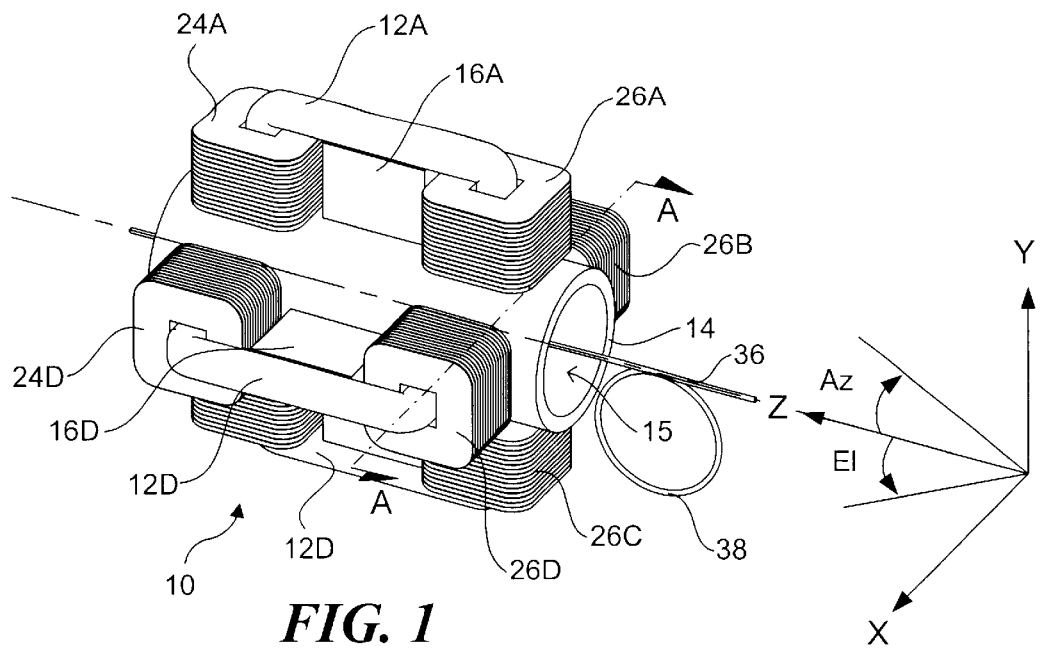
FIG. 1
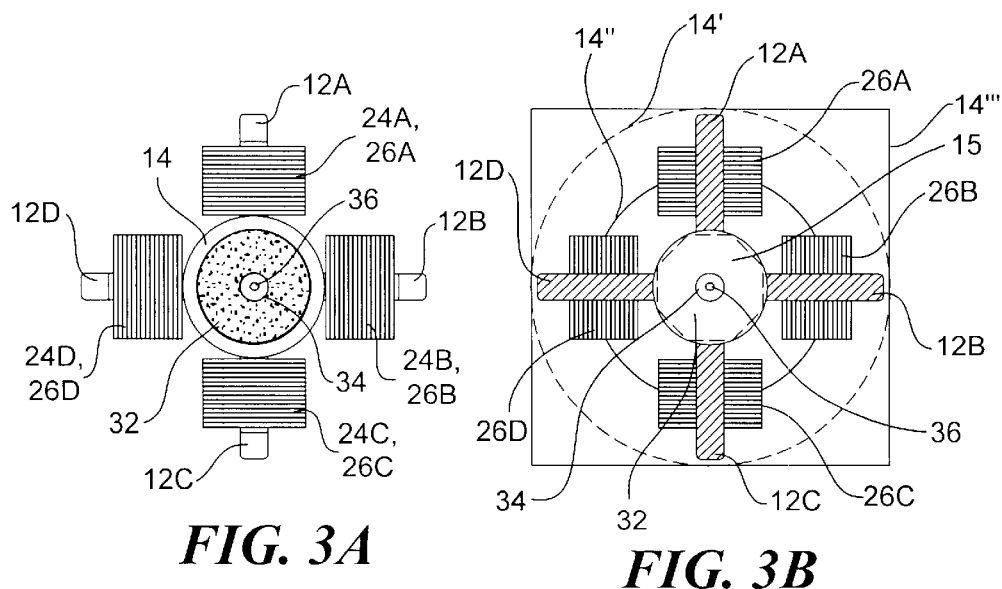
FIG. 3A  FIG. 3B

Positional Force $F_X = K (I_{LX} + I_{TX})$ (1)

$F_Y = K (I_{LY} + I_{TY})$ (2)

$F_Z = K \{(I_{LX} + I_{LY}) - (I_{TX} + I_{TY})\}$ (3)

Positional Torque $T_{EL} = K (I_{LY} - I_{TY})$ (4)

$T_{AZ} = K (I_{LX} - I_{TY})$ (5)

Five degrees of freedom are controlled over the acquisition volume as shown.

dEL by dAZ
6.0° by 6.0°

δx by δy
8 x 8 mm

δz = 8 mm

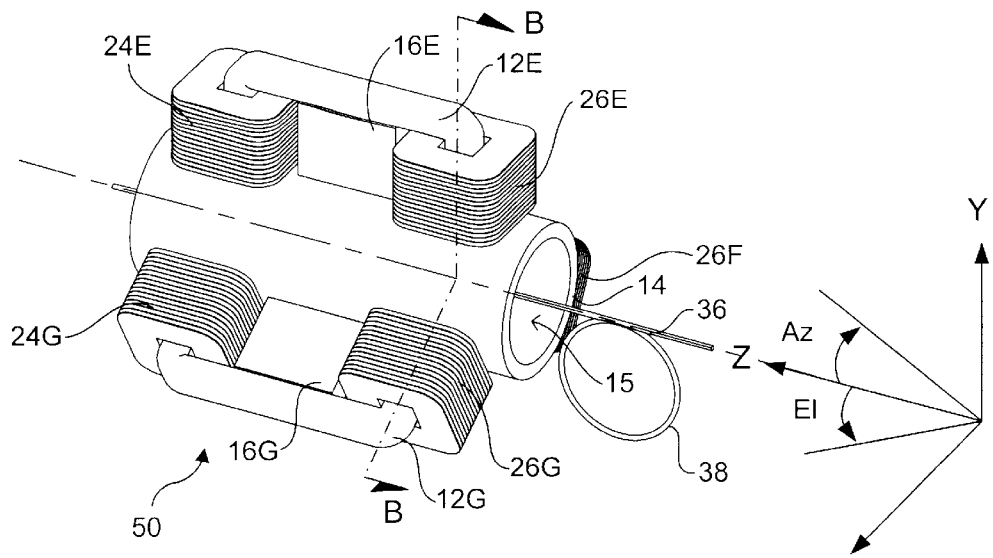
FIG. 5
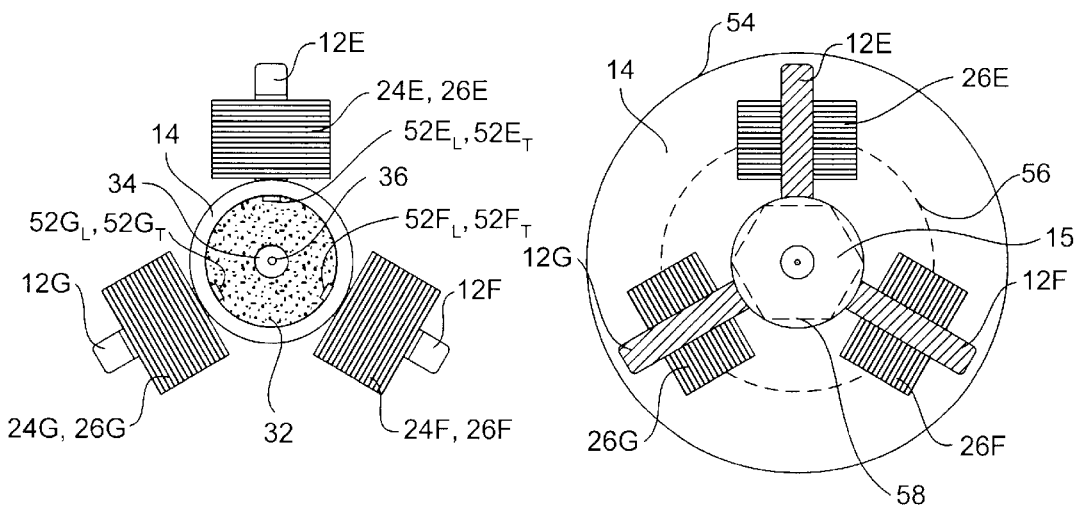
FIG. 7A  FIG. 7B

CONDUCTIVE FLUID-BASED POSITION SENSOR AND METHOD

CROSS-REFERENCE TO RELATED APPLICATION

The present application is a divisional of co-pending U.S. application Ser. No. 09/805,655, filed Mar. 13, 2001, and titled CONDUCTIVE FLUID-BASED POSITION SENSOR AND METHOD. The benefit of the filing date of the above-referenced application is hereby claimed pursuant to 35 U.S.C. §120.

BACKGROUND OF THE INVENTION

1. Field of the Invention

The present invention relates generally to position sensors, and, more specifically, to a positioning sensor that determines the position of a conductor contained in a conductive fluid.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first location to the second location.

An important aspect of a free space optical communications system is tracking. In particular, it is important that the optical communications beam (e.g., laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include the swaying of the buildings due to for example windy conditions, vibration of the platforms on which the transmitter and/or receiver are mounted, atmosphere-induced beam steering, etc. If the tracking system is unable to compensate for disturbances, the optical communications beam is no longer properly aimed at the receiver and, consequently, communications between the transmitter and receiver are lost or impaired.

SUMMARY OF THE INVENTION

The present invention provides an apparatus and method for determining a position and/or orientation of a conductor disposed in a conductive fluid. A plurality of electrodes disposed about the conductor and preferably being in contact with the conductive fluid are used to provide an electrical path between each electrode and the conductor. In one embodiment, resistances between each electrode and conductor are determined through use of a signal processing circuit. In another embodiment, capacitances between each electrode and the conductor are determined using a similar signal processing circuit. Once the resistances or capacitances are determined, the position of the conductor can be determined based on these values in combination with parameters relating to the configuration of the electrodes and conductor, as well as characteristics of the conductive fluid. In one implementation, the invention may be used in free space optical communication systems, whereby the position of the end portion of the fiber optic cable can be determined.

According to a first aspect of the invention, the apparatus comprises a plurality of electrodes that are fixedly disposed relative to a cavity containing the conductive fluid. In one embodiment, the plurality of electrodes are configured as a leading set of coplanar electrodes disposed on one end of the conductor, and a trailing set of coplanar electrodes disposed toward the other end of the conductor. In one configuration each of the leading and trailing sets of coplanar electrodes are radially arrayed about the cavity using substantially equal angles between each pair of radially-adjacent conductors. In one implementation of this configuration, there are three leading and three trailing electrodes. In one embodiment, the apparatus further comprises means for measuring resistances between each electrode and the conductor. In another embodiment, the apparatus includes means for measuring capacitances between the electrodes and the conductor. The apparatus further comprises a processing means for determining the position and/or orientation of the conductor based on the resistance or capacitive values that are determined.

In one embodiment, the means for measuring the resistances and processing means are provided by a signal processing circuit that includes a first multiplexer that receives a reference voltage as an input that is multiplexed to each of the electrodes in the leading set of electrodes via respective leads connected to those electrodes. A second multiplexer, having a plurality of multiplexed inputs that are connected to respective leads for each of the electrodes in the trailing set is then used to multiplex electrical paths between the conductor and the trailing set of electrodes. Using both of the multiplexers, electrical paths between any electrode in the leading set and any electrode in the trailing set can be established. Voltages corresponding to these multiplexed electrical paths are then received by an analog-to-digital converter, which produces digitized data corresponding to the voltages. This digitized data is then processed by the processing means, which typically may comprise a digital signal processor, an ASIC, a microcontroller, or other type of processor. In general, the position of the conductor can be determined by solving a set of equations with the processing means based on the configuration of the electrodes and other parameters discussed above. For example, in the implementation comprising three leading and three trailing electrodes, a six-by-six matrix corresponding to six simultaneous equations may be solved to determine the values for each resistance or capacitance. Once these values are known, further processing is performed to yield the position and/or orientation of the conductor.

According to other aspects of the invention, methods are provided for determining the position and/or orientation of the conductor based on the foregoing apparatus embodiments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is an isometric view of a first exemplary configuration of an electromagnetic positioner in accord with the present invention;

FIG. 3A is an end view of the electromagnetic positioner of FIG. 1;

FIG. 3B shows an end view of various optional configurations of the non-magnetic body used in the electromagnetic positioner of FIG. 1;

FIG. 5 is an isometric view of a second exemplary configuration of an electromagnetic positioner in accord with the present invention;

FIG. 7A is an end view of the electromagnetic positioner of FIG. 5;

FIG. 7B is an end view of various optional configurations of the non-magnetic body used in the electromagnetic positioner of FIG. 5;

DETAILED DESCRIPTION

Figure 2A:
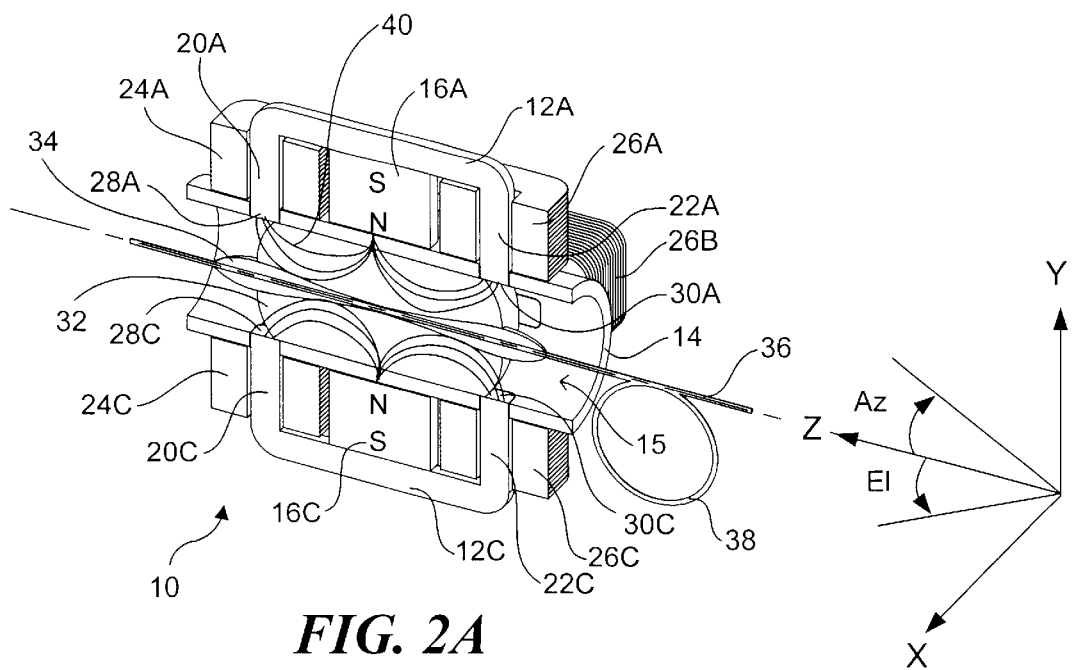
FIGS. 2A and 2B respectively show unhatched and hatched isometric cross-sections of the electromagnetic positioner of FIG. 1 taken along section cut A—A.
Figure 2B:
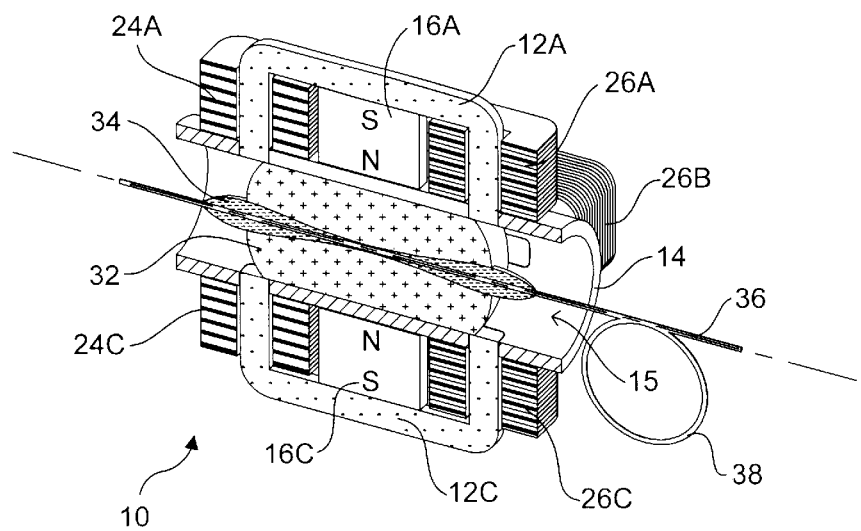

In one aspect of the present invention, methods and apparatuses for determining the position of a conductor disposed in a conductive fluid are disclosed. In the following description, numerous specific details are set forth in order to provide a thorough understanding of the present invention. In particular, the invention is describes as being implemented in a free space communications system wherein it is desired to determine the position and orientation of the end portion of a fiber optic cable. This is not meant to be limiting, as the invention may be implemented in various environments requiring the position of a component to be determined. Furthermore, it will be apparent to one having ordinary skill in the art that the specific details provided herein need not be employed to practice the present invention. In other instances, well-known materials or methods have not been described in detail in order to avoid obscuring the present invention.

In one example implementation of the present invention, point-to-point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

In order to optimize signal strength, it is necessary to be able to continually control the position and/or orientation of an end portion of a fiber optic cable that is used for producing a transmitted optical signal or receiving an optical signal from an external transmitting source. Therefore, a positioning device is needed to control the position of the end portion of the fiber optic cable such that the signal strength of the transmitted signal and the received signal, as appropriate, is maximized. Furthermore, the positioning device needs to have very high bandwidth and be insensitive to vibrations. In addition, a means for sensing the position of the end portion of the fiber optic cable also needs to be provided.

An exemplary configuration of an electromagnetic positioner 10 corresponding in which the present invention may be implemented is shown in FIGS. 1, 2A–B, and 3A–B. Electromagnetic positioner 10 includes a four U-shaped magnetic cores 12A, 12B, 12C, and 12D radially arrayed approximately 90 degrees apart about the periphery of a tube-shaped non-magnetic body 14 in which a cavity 15 is defined. As used herein, a component that is labeled "magnetic" is made of a material that exhibits magnetic characteristic when exposed to a magnetic field, while a component labeled non-magnetic is made of a material that does not exhibit magnetic characteristic when exposed to a magnetic field. Electromagnetic positioner 10 further includes four magnets 16A, 16B, 16C, and 16D disposed adjacent to respective U-shaped magnetic cores 12A–D so as to form "E" configurations.

Each of magnetic cores 12A–D includes a pair of arms 20n and 22n around which respective windings 24n and 26n are disposed, wherein the "n" corresponds to the suffix of that magnetic core (e.g., magnetic core 12A would include arms 20A and 22A and windings 24A and 26A). As used herein and in the following claims, each sub-assembly comprising a magnetic core 12n and coils 24n and 26n is called an "electromagnetic stator."

Returning to magnetic cores 12n, each of arms 24n and 26n further include a respective end 28n, 30n in contact with a magnetic fluid 32 disposed within non-magnetic body 14. Preferably, cavity 15 for non-magnetic body 14 is formed such that the faces of ends 28A–D and 28A–D are substantially flush with the surrounding inner wall of non-magnetic body 14. For example, the apparatus may be manufactured by holding the magnetic stators in a jig and pouring a non-magnetic material into a mold that defines the external configuration of the non-magnetic body. As discussed below, the specific external configuration of non-magnetic body 14 is not critical. After the non-magnetic material is set, a boring operation may be applied to the non-magnetic body such that part of the ends 28n and 30n of cores 12n are removed.

An armature 34 having a longitudinal bore housing an end portion of a fiber optic cable 36 is disposed within magnetic fluid 32, which is "held" in cavity 15 by a static magnetic field, as discussed below. Preferably, armature 34 comprises a non-magnetic material, such as glass or a non-magnetic metal, and is formed in the shape of an elongated "8" rotated about the Z-axis or a similar configuration in which the cross-section of outer portions of the armature is larger than the cross section toward the center of the armature so as to create an inclined plane to enable armature 34 to be moved by magnetic fluid 32. In addition, it is preferable that fiber optic cable 36 includes a service loop 38 to enable armature 34 (and thus the end portion of the fiber optic cable) to freely move in the X, Y and Z directions, as well elevation (El) and azimuth (Az) orientations depicted in the Figures.

Magnetic fluid 32 may comprise one of several fluids that exhibit magnetic characteristics when exposed to a magnetic field. Such fluids include various magnetic fluids marketed under the trade name "ferrofluids," as well as other fluids in which magnetic particles are dispersed. As discussed above, each of magnetic cores 12A–D comprises a magnetic material, such as iron or various well-known magnetic alloys. As a result, the interaction between magnets 16A–D and magnetic cores 12A–D produces eight magnetic fields, as illustrated by magnetic flux lines 40. These magnetic fields are superimposed to generate a magnetic field in 3D space that holds a volume of magnetic fluid 32 within non-magnetic body 14. This enables magnetic fluid 32 to be held within cavity 15 under a normal non-powered condition, that is when there is no current is flowing through any of windings 24A–D or 26A–D.

Another characteristic of magnetic fluid 32 is that objects contained within the fluid may be displaced and/or rotated by varying a magnetic field passing through the fluid. Preferably, such objects will be non-magnetic such that they won't be affected by the magnetic field itself. As a result, a coordinate position of the armature 34 corresponding to a displacement relative to a superimposed X-Y-Z coordinate system may be controlled, as well as its elevation (i.e., pitch or tilt about the X axis) and azimuth (i.e., yaw or pan about the Y axis) orientations by controlling the current that flows through each of coils 24A–D and 26A–D.

Figure 4A:
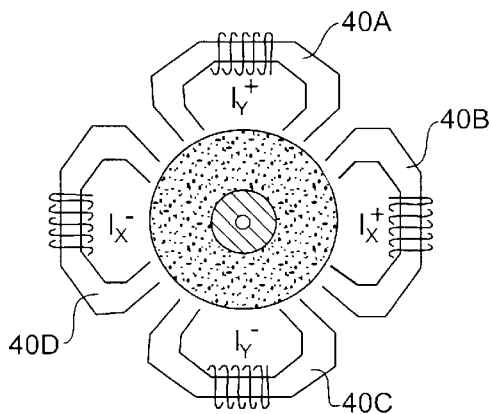
FIG. 4A is a schematic diagram and a corresponding set of equations for illustrating the effect of providing various currents to the electromagnets of the electromagnetic positioner of FIG. 1.
Figure 4B:
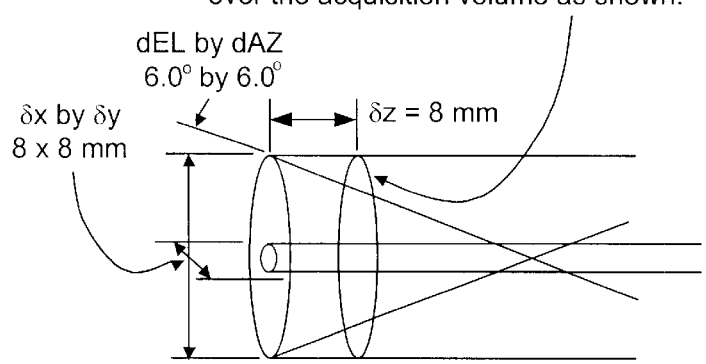
FIG. 4B illustrates an acquisition volume over which the armature of the electromagnetic positioner of FIG. 1.

The effect of applying various currents to coils 24A–D and 26A–D is modeled in FIG. 4A, wherein electromagnets 40n correspond to coils 24n and 26n, with the "L" subscript in the equations represents "leading" coils (i.e., coils 24n) and the "T" subscript represents "trailing" coils (i.e., coils 26n). The positional forces may be determined by the following equations:

$$F_X = K(I_{LX} + I_{TX}) \quad (1)$$

$$F_Y = K(I_{LY} + I_{TY}) \quad (2)$$

$$F_Z = K\{(I_{LX} + I_{LY}) - (I_{TX} + I_{TY})\} \quad (3)$$

and the positional torque is defined by:

$$T_{EL} = K(I_{LY} - I_{TY}) \quad (4)$$

$$T_{AZ} = K(I_{LX} - I_{TX}) \quad (5)$$

wherein $I_{mn}$ represents the current flowing through a given coil and K is a magnetic constant that is a function of the magnetic characteristics of magnetic cores 12 and magnetic fluid 32, as well as various parameters of the coils themselves.

In the foregoing equations 1–5, $I_{mn}$ is the sum of values $I_{mn+} + I_{mn-}$ depicted in FIG. 4A. For example, armature 34 can be caused to be displaced in the Y direction (due to a displacement of magnetic fluid 32) by having the current flowing through coils 24A and 26A be slightly greater than the current flowing through coils 24C and 26C (yielding $F_Y > 0$), while the currents flowing through coils 24B, 26B, 28B and 28D is substantially equal (yielding $F_X = 0$). Preferably, to obtain such a position without causing any rotation, the current in coils corresponding to each arm would be equal, i.e., the current flowing through arms 24A and 26A would be equal, while the current flowing through arms 24C and 26C would be equal. In a similar manner, armature 34 can be displaced along the X-axis by applying a different current through coils 24B and 26B than that passing through coils 24D and 26D, while the current flowing through coils 24A, 24C, 26A, and 26C is substantially equal.

As shown by equation (3), armature 34 can also be moved along the Z-axis, which has defined herein is superimposed along the centerline of cavity 15 defined in non-magnetic body 14. Moving armature 34 forward in the Z direction may be accomplished by applying a greater current to coils 24A–D than to coils 26A–D, wherein the currents in coils 24A–D are substantially equal, and the currents in coils 26A–D are substantially equal. Moving armature 32 backward is performed in a similar manner, except in this instance the greater current is applied to coils 26A–D rather than 24A–D.

Additionally, as shown by equations 4 and 5, armature 34 can also be pivoted (generally about its midpoint) so as to create a controlled elevation (EL) and/or azimuth (AZ) orientation, wherein elevation comprises an angular position in the YZ plane (i.e., a rotation about an axis parallel to the X axis), and azimuth comprises an angular position in the XZ plane (i.e., a rotation about an axis parallel to the Y axis).

In general, non-magnetic body 14 performs the function of a primary structure component having a cavity in which magnetic fluid 32 is disposed. Since non-magnetic materials are not affected by magnetic fields, the external shape of non-magnetic body 14 is not critical, as discussed above. For example, as depicted by non-magnetic bodies 14' and 14" in FIG. 3B, non-magnetic body 14 may have various cylindrical external configurations, as well as a cube-shaped external configuration, as depicted by a non-magnetic body 14'''. Furthermore, the internal shape of non-magnetic body 14 may comprise a circular cross-section, octagon-shaped cross section, or one of many other configurations not shown. Furthermore, the internal cross-section need not be constant. However, it is preferable that the internal cross section be symmetrical about its centerline (i.e., the axis coincident to the Z-axis in most configurations), as it makes equations for modeling the behavior of magnetic fluid 32 easier to formulate.

An alternative configuration corresponding to a magnetic positioner 50 is shown in FIGS. 5A, 6A–C, and 7A–7B. In this configuration, three electromagnetic stators are radially arrayed around non-magnetic body 14 with an angular spacing of approximately 120 degrees. As depicted in FIGS.

Figure 6A:
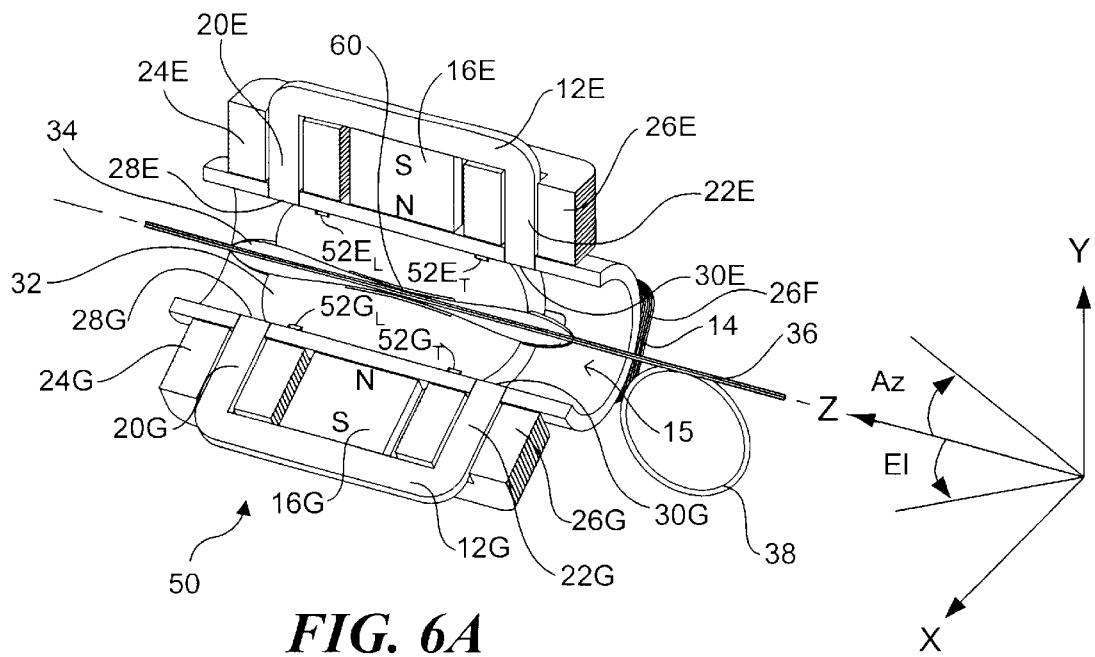
FIGS. 6A and 6B respectively show unhatched and hatched isometric cross-sections of the electromagnetic positioner of FIG. 5 taken along section cut B—B.
Figure 6B:
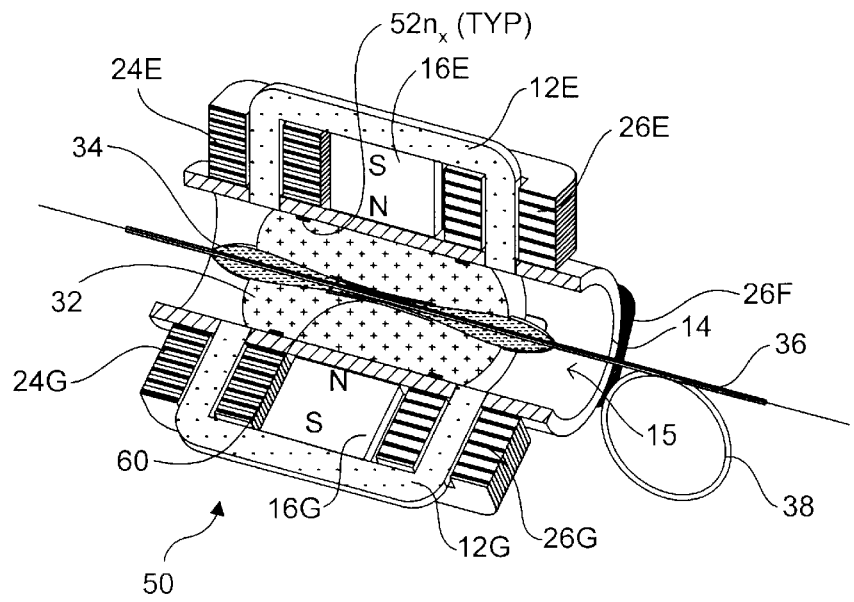
Figure 6C:
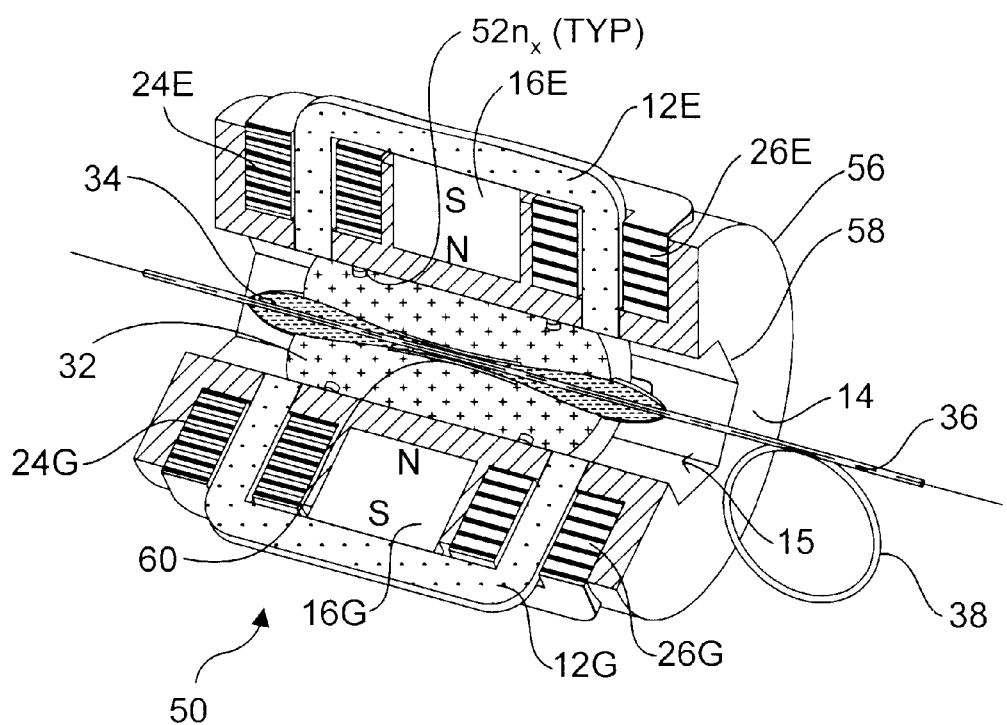

5A, 6A–C, and 7A–7B, elements having a base reference number in common with elements discussed above perform substantially similar functions; these elements have suffixes "E", "F", and "G" in these Figures. As shown in FIG. 7B, non-magnetic body 14 may comprise an external configuration 54 in which the other components of magnetic positioner 50 are completely contained, an external configuration 56 in which the other components are partially contained, or other configurations not shown. In addition, the internal configuration of non-magnetic body 14 may comprise a cylindrical bore or a hexagon 58, as shown in FIGS. 7B and 6C, as well as other configurations not shown.

Figure 8A:
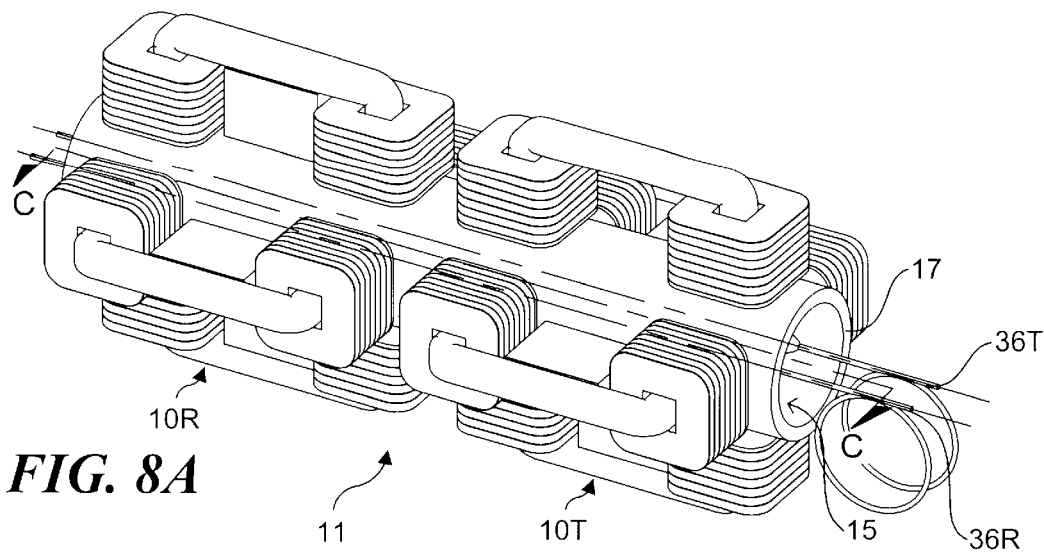
Figure 8B:
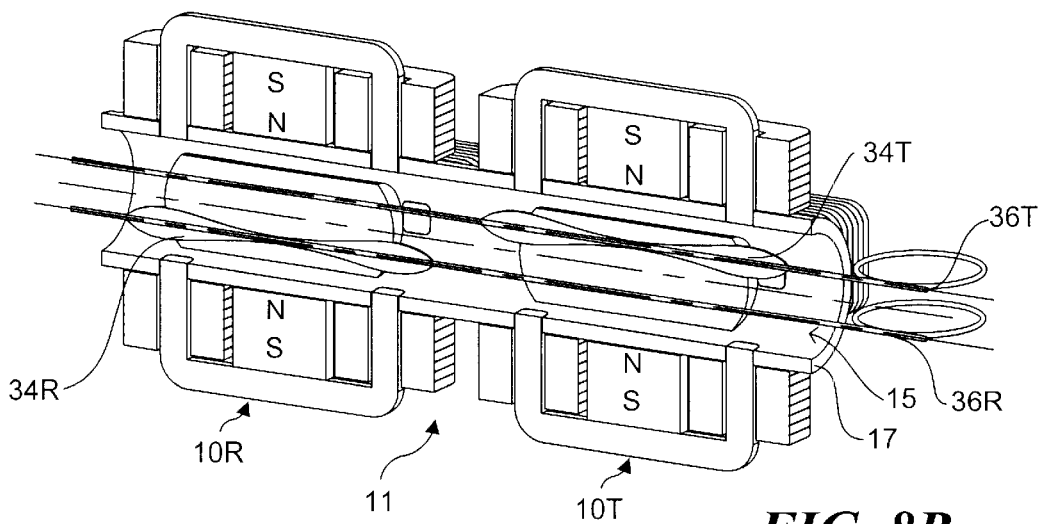
Figure 8C:
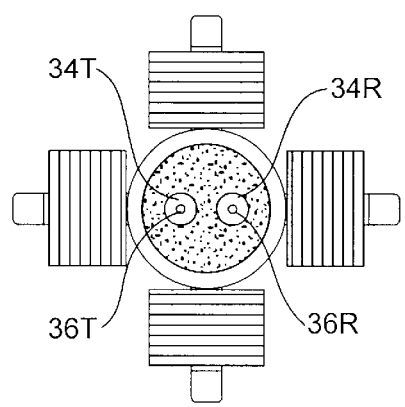

A tandem electromagnetic positioner 11 that enables the alignment of end portions of a receiving fiber optic cable 36R and a transmitting fiber optic cable 36T is shown in FIGS. 8A–C. Tandem electromagnetic positioner 11 substantially comprises two electromagnetic positioners 10R and 10T placed end-to-end, wherein electromagnetic positioners 10R and 10T have configurations similar to electromagnetic positioner 10 discussed above, except that a single non-magnetic body 17 preferably is used instead of two non-magnetic bodies 14. Optionally, tandem electromagnetic positioner 11 may substantially comprise two electromagnetic positions having configurations similar to electromagnetic positioner 50 (not shown). In a manner similar to that discussed above, an armature 34R can be positioned by controlling the magnetic fields produced by the electromagnets in electromagnetic positioner 10R, while an armature 34T can be positioned by controlling the magnetic fields produced by the electromagnets in electromagnetic positioner 10T. As shown in FIG. 8C, armatures 34R and 34T are offset from one another so that positioning of one armature will not interfere with the positioning of the other armature.

With reference to FIGS. 6A–C, 7A and 9A–B, magnetic positioner 50 may optionally include an integrated position sensing system that includes a plurality of electrodes $52n_x$, wherein the "n" corresponds to the nearest stator, and the "x" is either an "L" for leading, or a "T" for trailing. The system further includes a conductor 60 comprising a metal sheath or plating disposed around the center portion of armature 34. Preferably, electrodes $52n_x$ are disposed within cavity 15 so as to be in electrical contact with magnetic fluid 32. In addition, it is preferable that each set of leading and trailing electrodes have a coplanar configuration.

Figure 9A:
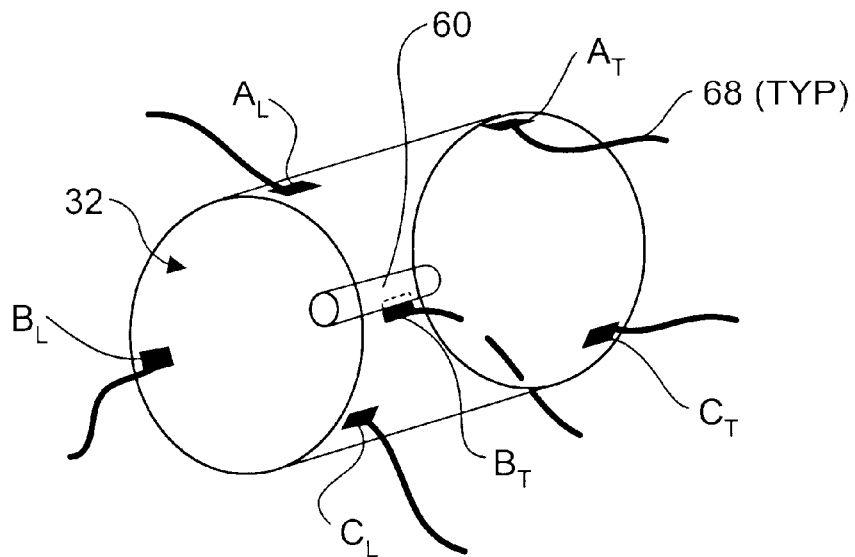
FIG. 9A is an isometric schematic diagram illustrating a configuration of the electrodes and conductor of the position sensor of the present invention.
Figure 9B:
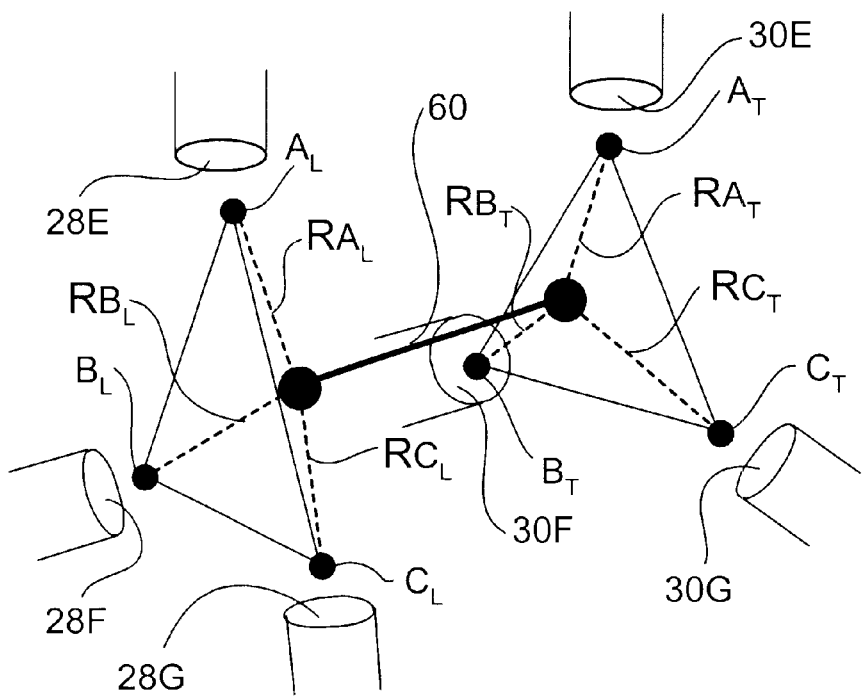
FIG. 9B is a schematic diagram illustrating the resistance paths measured during operation of the position sensor to determine the position of conductor.
Figure 10A:
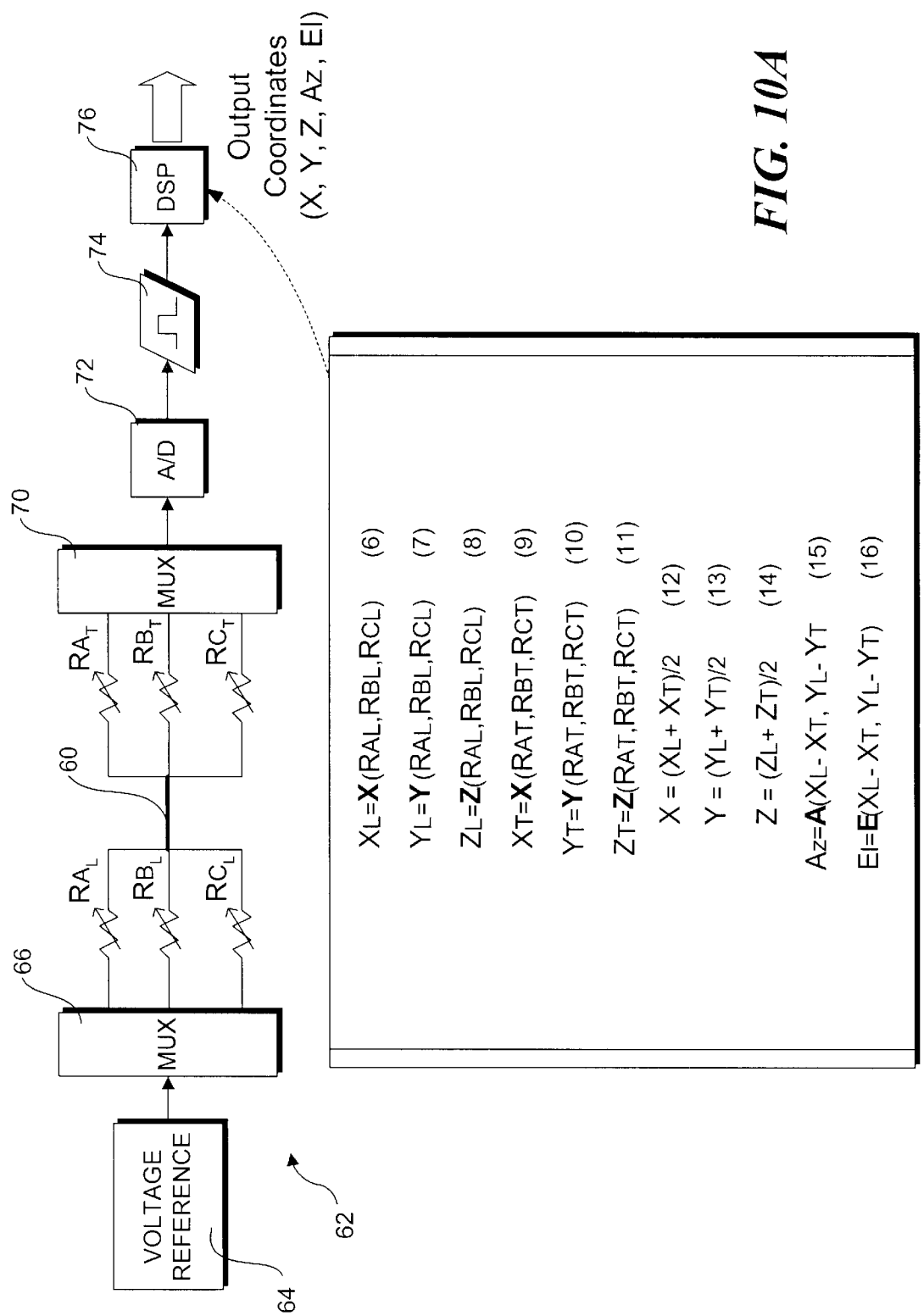
FIG. 10A is a block schematic diagram of first embodiment of an electrical circuit that may be implemented in the position sensor, wherein the position of a conductor is determined by measuring resistances between various electrodes and the conductor.
Figure 10B:
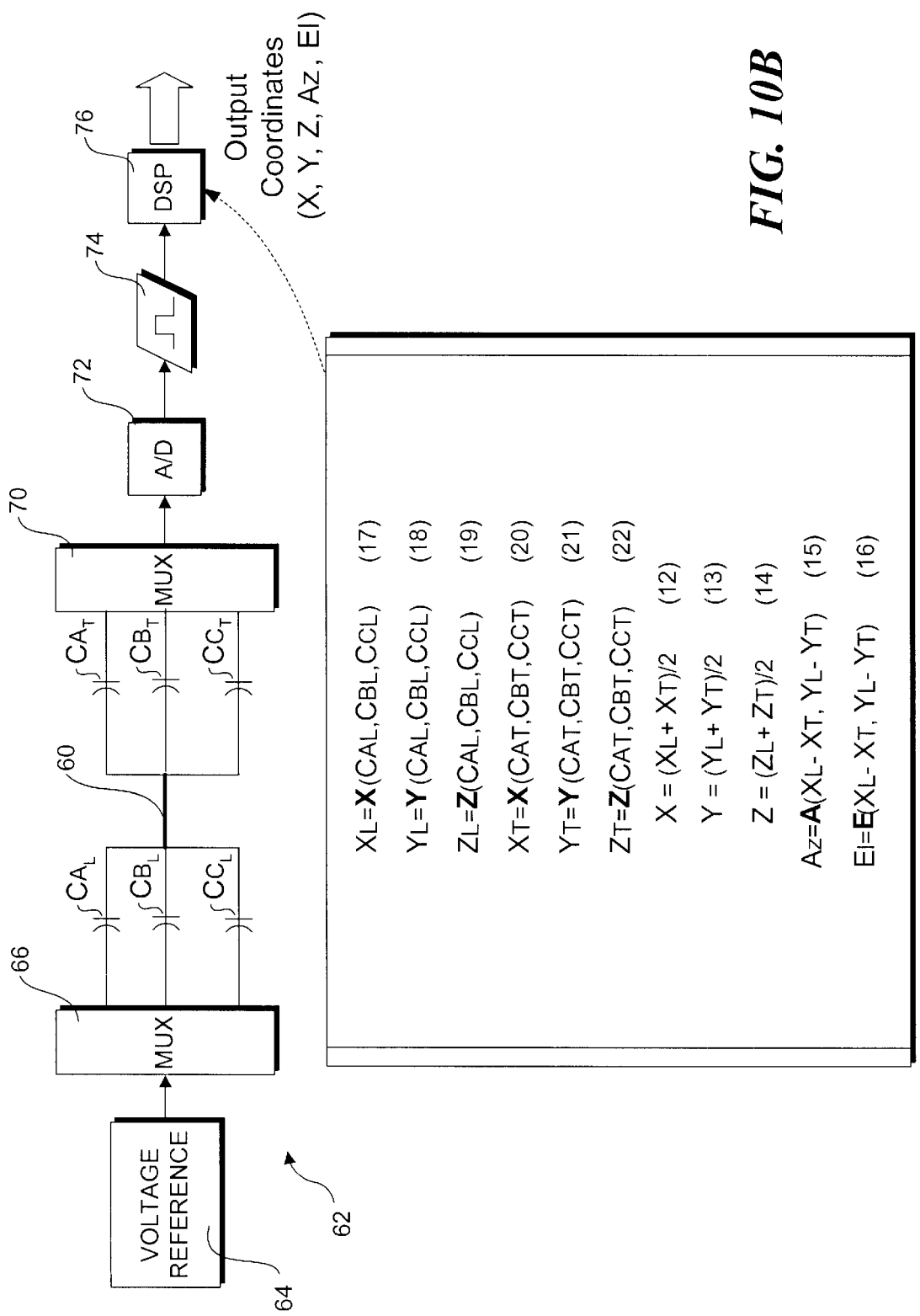
FIG. 10B is a block schematic diagram of second embodiment of an electrical circuit that may be implemented in the position sensor, wherein the position of the conductor is determined by measuring capacitances between various electrodes and the conductor.

As illustrated in FIGS. 9A–B and 10A, the position sensing system works by measuring the resistance along electrical paths defined between each electrode and ends of conductor 60 nearest those electrodes. Alternatively, the capacitance across these paths may be measured in a similar matter, as shown in FIG. 10B. Although modeled as single resistances and capacitances, the actual resistance or capacitance between each electrode and the conductor comprise a plurality of paths having parallel resistances or capacitances, as applicable. For simplicity, these are modeled as single resistances and capacitances herein.

An exemplary processing circuit 62 for determining the resistance values is shown in FIG. 10. Circuit 62 includes a voltage reference 64, and a first multiplexer 66 coupled to a free end of respective leads 68 connected to leading electrodes $52E_L$, $52F_L$, and $52G_L$. (Note, leads 68 are not shown in FIGS. 6A–C and 7A for clarity). Electrodes $52E_L$, $52F_L$, and $52G_L$ are electrically coupled to one end of conductor 60 by means of magnetic fluid 32. These couplings have resistances that are substantially proportional to the distance between each electrode and the end of the conductor, which are modeled by resistances $R_{AL}$, $R_{BL}$, and $R_{CL}$.

Similarly, the other end of conductor 60 is coupled to electrodes $52E_T$, $52F_T$, and $52G_T$ by means of magnetic fluid 32, with the resistances being modeled by resistances $R_{AT}$, $R_{BT}$, and $R_{CT}$. The coupled electrical signals are then received by a second multiplexer 70 at free ends of respective leads 68 corresponding to these trailing electrodes. The analog signals received by multiplexer 70 are then multiplexed into an analog-to-digital converter 72, which feeds digitized signal data 74 into a digital signal processor 76.

Digital signal processor 76 is used to process digitized signal data 74 to determined the values for resistances $R_{AL}$, $R_{BL}$, $R_{CL}$, $R_{AT}$, $R_{BT}$, and $R_{CT}$. Once these resistance values are known, the position of conductor 60 can be determined. For example, in one embodiment the position of conductor 60 can be determined using the following equations:

$$X_L = X(R_{AL}, R_{BL}, R_{CL}) \quad (6)$$

$$Y_L = Y(R_{AL}, R_{BL}, R_{CL}) \quad (7)$$

$$Z_L = Z(R_{AL}, R_{BL}, R_{CL}) \quad (8)$$

$$X_T = X(R_{AT}, R_{BT}, R_{CT}) \quad (9)$$

$$Y_T = Y(R_{AT}, R_{BT}, R_{CT}) \quad (10)$$

$$Z_T = Z(R_{AT}, R_{BT}, R_{CT}) \quad (11)$$

$$X = (X_L + X_T)/2 \quad (12)$$

$$Y = (Y_L + Y_T)/2 \quad (13)$$

$$Z = (Z_L + Z_T)/2 \quad (14)$$

$$Az = A(X_L - X_T, Y_L - Y_T) \quad (15)$$

$$El = E(X_L - X_T, Y_L - Y_T) \quad (16)$$

Equations 6–11 and 15–16 may be solved simultaneously using well-known techniques, such as linear algebra matrix processing, to yield a solution set from which the linear position of armature 34 along the X, Y, and Z axis and an elevation (El) and azimuth (Az) of armature 34 relative to the Z axis can be derived.

As discussed above, the position of conductor 60 can also be determined by using capacitance measurements rather than resistance measurements. As illustrated in FIG. 10B, a similar process to that described above in the resistance measurement method may be implemented to determine the coordinate position and/or orientation of conductor 60, wherein the values of capacitances $C_{AL}$, $C_{BL}$, $C_{CL}$, $C_{AT}$, $C_{BT}$, and $C_{CT}$ are solved for using the following equations.

$$X_L = X(C_{AL}, C_{BL}, C_{CL}) \quad (17)$$

$$Y_L = Y(C_{AL}, C_{BL}, C_{CL}) \quad (18)$$

$$Z_L = Z(C_{AL}, C_{BL}, C_{CL}) \quad (19)$$

$$X_T = X(C_{AT}, C_{BT}, C_{CT}) \quad (20)$$

$$Y_T = Y(C_{AT}, C_{BT}, C_{CT}) \quad (21)$$

$$Z_T = Z(C_{AT}, C_{BT}, C_{CT}) \quad (22)$$

$$X = (X_L + X_T)/2 \quad (12)$$

$$Y = (Y_L + Y_T)/2 \quad (13)$$

$$Z = (Z_L + Z_T)/2 \quad (14)$$

$$Az = A(X_L - X_T, Y_L - Y_T) \quad (15)$$

$$El = E(X_L - X_T, Y_L - Y_T) \quad (16)$$

In general, the position sensor of the present invention may be implemented with any conductive fluid, as well as the magnetic fluid embodiments described herein.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. A position sensor comprising:

a conductor disposed in a conductive fluid;

a plurality of electrodes fixedly disposed relative to a cavity containing the conductive fluid;

means for measuring a capacitance between each electrode and the conductor; and processing means for determining a coordinate position of the conductor based on the capacitances between each electrode and the conductor that are measured.

2. The positioning sensor of claim 1, wherein said processing means further is enabled to determine an orientation angle of the conductor.

3. The position sensor of claim 1, wherein said means for measuring the capacitance between each electrode and the conductor includes a multiplexing circuit coupled to an analog-to-digital converter that provides digitized data to the processing means.

4. The positioning sensor of claim 1, wherein said processing means comprises a digital signal processor.

5. The position sensor of claim 1, wherein said plurality of electrodes are disposed radially about a cavity in which the conductive fluid is disposed.

6. The position sensor of claim 5, wherein said plurality of electrodes comprises a set of leading coplanar electrodes disposed toward a first end of the conductor, and a set of trailing coplanar electrodes disposed toward an opposite end of the conductor.

7. The position sensor of claim 6, wherein each of the sets of leading and trailing coplanar electrodes comprises three electrodes radially arrayed about the conductor with an angular spacing of approximately 120 degrees apart.

8. The position sensor of claim 6, wherein said means for measuring the capacitance between each electrode and the conductor includes:

a first multiplexer, receiving a reference voltage as an input that is multiplexed to respective leads connected to each of the electrodes in the leading set;

a second multiplexer, having a plurality of multiplexed inputs that are connected to respective leads for each of the electrodes in the trailing set;

an analog-to-digital converter, connected to the output of the second multiplexer; and the processing means, programmed to solve a plurality of equations to determine the coordinate position of the conductor.

9. The positioning sensor of claim 1, wherein said processing means comprises a digital signal processor.

10. The position sensor of claim 1, wherein the conductor comprises one of a metallic sleeve or cladding disposed about an end portion of a fiber optic cable, thereby enabling a coordinate position of the end portion of the fiber optic cable to be determined.

11. A method for determining a position and/or orientation of a conductor, comprising:

disposing the conductor in a conductive fluid;

providing a plurality of electrodes that are fixedly displaces relative to a cavity in which the conductive fluid is held;

determining capacitances between each electrode and the conductor; and calculating the position and/or orientation of the conductor based on the capacitances that are determined.

12. The method of claim 11, wherein said plurality of electrodes are disposed radially about the cavity in which the conductive fluid is disposed.

13. The method of claim 11, wherein said plurality of electrodes comprises a set of leading coplanar electrodes disposed toward a first end of the conductor, and a set of trailing coplanar electrodes disposed toward an opposite end of the conductor.

14. The method of claim 13, wherein each of the sets of leading and trailing coplanar electrodes comprises three electrodes radially arrayed about the conductor with an angular spacing of approximately 120 degrees apart.

15. The method of claim 13, wherein the position and/or orientation of the conductor is determined by performing the operations of:

measuring capacitances across respective combinations of leading and trailing electrodes; and solving a plurality of simultaneous equations to determine the position and/or orientation of the conductor based on the capacitances that are measured.

16. The method of claim 15, wherein the position and/or orientation of the conductor are determined by a circuit including:

a first multiplexer, receiving a reference voltage as an input that is multiplexed to respective leads connected to each of the electrodes in the leading set;

a second multiplexer, having a plurality of multiplexed inputs that are connected to respective leads for each of the electrodes in the trailing set;

an analog-to-digital converter, connected to the output of the second multiplexer to measure the capacitances across the respective combinations of leading and trailing electrodes; and a processing means, programmed to solve the plurality of simultaneous equations to determine the position and/or orientation of the conductor.

17. The method of claim 11, wherein the conductor comprises one of a metallic sleeve or cladding disposed about an end portion of a fiber optic cable, further comprising determining a position of the end portion of the fiber optic cable based on the position of the conductor that is determined.

* * * * *